United States Patent [19]
Inman

[11] Patent Number: 5,148,675
[45] Date of Patent: Sep. 22, 1992

[54] MARINE EXHAUST MANIFOLD AND HEADER PIPE SYSTEM

[76] Inventor: Frederick R. Inman, 250 Silver Tree, Glendora, Calif. 91740

[21] Appl. No.: 692,219

[22] Filed: Apr. 26, 1991

[51] Int. Cl.⁵ .................................... F01N 7/10
[52] U.S. Cl. ........................ 60/321; 60/322; 60/323
[58] Field of Search ................ 60/321, 322, 323

[56] References Cited

U.S. PATENT DOCUMENTS

| | | | |
|---|---|---|---|
| 3,884,194 | 5/1975 | Grosseau | 60/321 |
| 3,938,330 | 2/1976 | Nakajima | 60/323 |
| 4,662,173 | 5/1987 | Wilkinson | 60/323 |

FOREIGN PATENT DOCUMENTS

| | | | |
|---|---|---|---|
| 3815408 | 12/1988 | Fed. Rep. of Germany | 60/323 |
| 41723 | 3/1977 | Japan | 60/323 |

*Primary Examiner*—Douglas Hart
*Attorney, Agent, or Firm*—Christie, Parker & Hale

[57] ABSTRACT

A water-jacketed exhaust manifold for a multi-cylinder internal combustion engine has a plurality of inlet ports which are connected via a cavity in the manifold to an outlet port formed in a face of the manifold. At least one septum member is disposed in the manifold to subdivide the cavity into at least two chambers with each of which are associated at least two inlet ports. Each septum extends in the outlet port to the manifold outlet face. A water-jacketed header pipe is connectible to the manifold face. A gas flow passage in the header pipe is subdivided by at least one septum over the length of the passage. Each header pipe septum is arranged to substantially align with and register with a corresponding manifold septum upon connection of the header pipe to the manifold.

8 Claims, 6 Drawing Sheets

MARINE EXHAUST MANIFOLD AND HEADER PIPE SYSTEM

FIELD OF THE INVENTION

This invention pertains to exhaust systems for internal combustion engines. More particularly, it pertains to such systems in which an exhaust manifold and related header pipe are internally divided to enhance engine performance. The preferred utility of the invention is in boats.

BACKGROUND OF THE INVENTION

It is common to mount multi-cylinder internal combustion engines within the hulls of boats, especially small boats, to provide propulsive power. Such engines can connect to propeller shafts mounted for rotation about axes fixed relative to the hull, or they can connect to steerable propeller arrangements or the like mounted to the exterior of the hull. Water-cooled automobile engines are commonly used in such boat contexts which are of two general kinds, namely, racing or high performance boats and general purpose or family boats. In boats of the first kind, the engine can be exposed, whereas in boats of the second kind, the engines are enclosed in housings which project into the passenger spaces of the boat. Where the engine is exposed, space and noise factors are not important, as a rule, and so an engine exhaust pipe can be provided for each engine cylinder and those pipes can project directly into the air, if desired. In general purpose or family boats, however, space, noise and temperature factors are quite important, and so engine exhaust systems in such boats are compact and water-cooled, and they are contained within the engine housing. The exhaust systems for engines in racing boats can be defined to maximize engine performance, but considerations of space and cost in general purpose boats severely limit the ability to affect engine performance through refinements in engine exhaust systems.

An exhaust system for an engine in a general purpose boat most commonly includes one or two exhaust manifolds connected directly to the engine, and a header pipe for each manifold. The header pipe connects to the manifold and extends either through the hull or to a further duct which extends through the hull. The manifolds and header pipes are water-jacketed, i.e., include in their walls passages through which water is pumped to cool the exhaust structures themselves as well as the engine exhaust gases which flow through them.

A need exists for exhaust systems, useful with engines mounted within the hulls of general purpose boats, which provide improvements in engine performance while also effectively observing the competing and limiting factors of space availability and cost.

SUMMARY OF THE INVENTION

This invention addresses the need identified above. It provides water-cooled exhaust manifolds and header pipe assemblies in which the spaces in them through which engine exhaust gases pass are subdivided over an extended path to minimize the extent to which exhaust gases emerging from one engine cylinder can present backpressure to another cylinder which fires closely in time to the one cylinder. Consequently, the engine operates more efficiently and develops more power than it would were the exhaust passage subdivisions not present. This improvement in engine performance is achieved simply, efficiently and economically without significant increase in the size of the structure.

Generally speaking, in terms of structure, this invention provides an exhaust manifold for a multi-cylinder internal combustion engine. The manifold includes a body which is internally configured to define a plurality of inlet ports which communicate within the body to an outlet port. The inlet ports open through a first face of the body via which the body can be mounted to an internal combustion engine of selected design for mating of the body inlet ports with respective exhaust openings defined by the engine in association with respective combustion chambers within the engine which fire in a selected sequence. The outlet port opens from the manifold body through a second face of the body via which the body can be connected to an exhaust pipe assembly for conducting engine exhaust gases from within the manifold to a desired discharge location spaced from the body. Septum means are located in the body for dividing the inlet ports into groups of at least two ports each and for isolating the body internal spaces associated with each group from the internal spaces associated with each other group. The septum means has an end in the outlet port substantially at the body second face.

DESCRIPTION OF THE ACCOMPANYING DRAWINGS

The above mentioned and other features and advantages of this invention are set forth in the following detailed description of the presently preferred ebodiment of the invention, which description is presented with reference to the accompanying drawings and in which.

DESCRIPTION OF THE ILLUSTRATED EMBODIMENT

Figure 1:
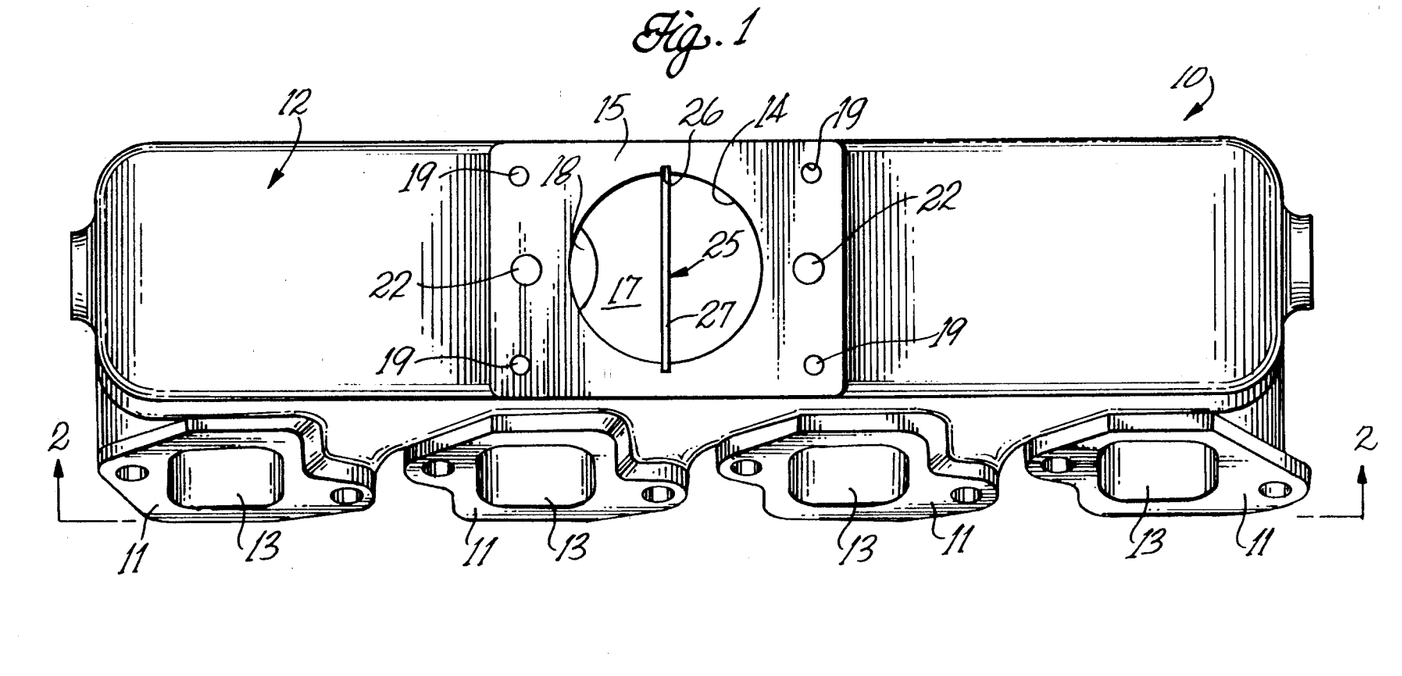
FIG. 1 is an elevation view of a water-jacketed exhaust manifold according to this invention.
Figure 2:
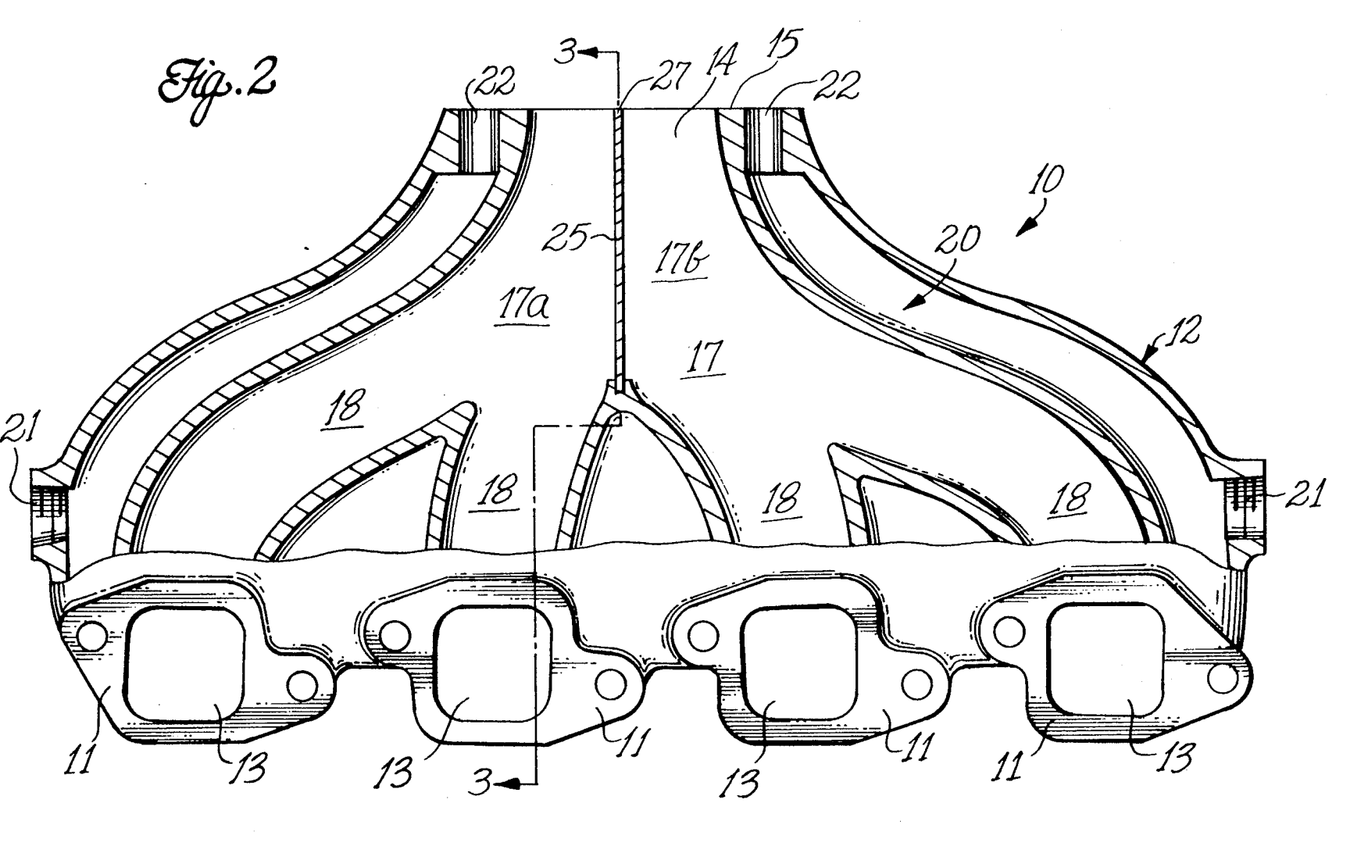
FIG. 2 is a view, partially in cross-section, taken substantially along line 2—2 of FIG. 1.
Figure 3:
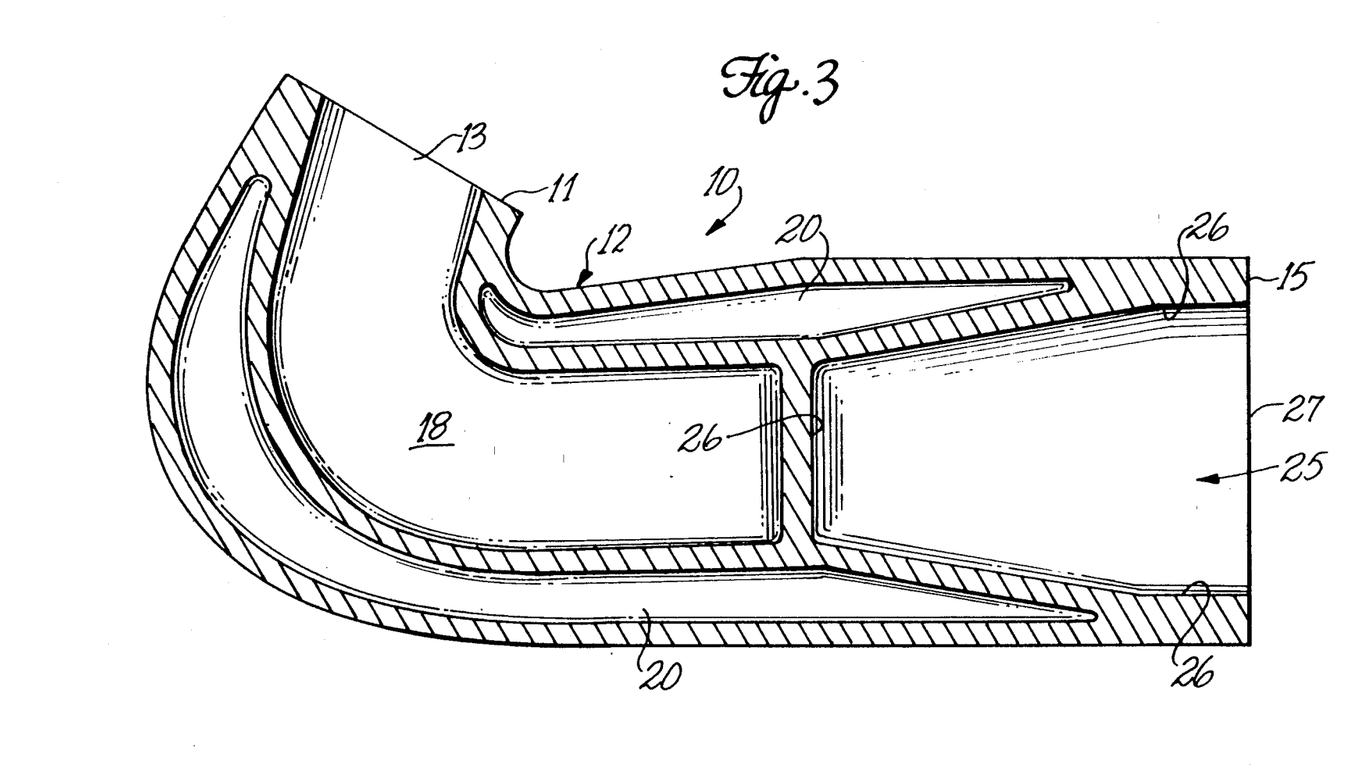
FIG. 3 is a cross-section view taken substantially along line 3—3 in FIG. 2.

FIGS. 1, 2 and 3 show a presently preferred water-jacketed exhaust manifold 10. Manifold 10 is configured for cooperation with a V8 automotive internal combustion engine in association with one set of four cylinders of such an engine. A substantially similar, but mirror image manifold would be used with the other four cylinders of the same V8 engine. Persons skilled in the art to which this invention pertains will readily appreciate that the specific geometry and configuration of manifold 10 is defined along the face thereof which mates with an internal combustion engine to mate with a specific design of internal combustion engine. Because manifold 10 is defined for cooperation with one side of a V8 automotive internal combustion engine, it defines, along a first face 11 of a body 12 of the manifold, four inlet ports 13. Also, the body defines an outlet port 14 through a second face 15 of the body. As shown in FIGS. 2 and 3, the interior of body 15 defines a cavity 17 which communicates to the outlet port and, through respective arms 18 of the cavity, to each of the inlet ports.

Faces 11 and 15 of body 12 lie in respective flat planes. These faces are relatively finely finished so that, with suitable gaskets, they can be mated to similarly finished faces of an engine block and an exhaust header pipe, respectively. As shown in FIGS. 1 and 2, suitable holes are provided through face 11 adjacent each of inlet ports 11 to facilitate connection of the manifold to an engine. Similarly, tapped holes 19 are formed in the corners of face 15 for use in coupling the manifold to a mounting flange of an exhaust header pipe 30 which is shown in FIGS. 4–7 and is described hereinafter.

As noted above, exhaust manifold 10 preferably is used in connection with an internal combustion engine mounted within the hull of boat intended for general purpose or family use. Typically, in such an application, the engine is mounted to the hull at a location within the passenger spaces of the boat and is enclosed in a soundproofing and thermally insulating enclosure. Quite commonly, such motor mounting and enclosure is disposed in the rear portions of the boat adjacent its stern for driving either a fixed axis propeller shaft or for driving a steerable "outline" propeller mechanism mounted to the exterior of the hull. In such applications, it is important that the exhaust gases emerging from the engine be cooled as they pass through the exhaust manifold and exhaust piping within the engine enclosure. Accordingly, manifold 10, a shown in FIGS. 1, 2 and 3, is a water-jacketed manifold which defines spaces 20 in its walls through which cooling water can flow around the more interior exhaust gas flow spaces within the manifold as defined by cavity 17 and its arms 18. A pair of internally threaded openings 21 are formed through the extreme outer walls of body 12 into spaces 20 at the ends of the body, as seen in FIG. 2, nearer to face 11 of the body than to face 15. It is via these openings that water flow pipes can be connected to the manifold in use for introducing cooling water into the jacket spaces 20 of the manifold. Cooling water leaves the jacket spaces of the manifold through water discharge openings 22 which open through face 15 of the manifold adjacent to exhaust gas outlet port 14; this is shown in FIGS. 1 and 2.

Exhaust manifold 10 preferably is a metal casting. The preferred manifold is made of 5086 aluminum heat treated to a T6 condition.

Exhaust manifold 10, as described to this point, is much like a conventional water-jacket exhaust manifold useful with a V-8 engine in a marine inboard-mount application. Manifold 10 differs, however, from a conventional manifold by the presence in the manifold of a septum member 25 which subdivides cavity 17 into chambers 17a and 17b. Two of cavity arms 18 are associated with chamber 17a in connection with the inlet ports 13 at one end of the manifold, and two arms 18 are associated with chamber 17b and the other two inlets ports at the other end of the manifold. As shown best in FIG. 3, septum member 25 preferably is a stainless steel plate which is relatively loosely received along three of its four basic sides in a recess 26 which is cast into manifold body 12 in a plane disposed diametrically of outlet port 14. The recess includes a portion which lies in a portion of the manifold body which provides a division between the central two cavity arms 18 as seen in FIG. 2. The septum plate has an end 27 which lies in, or slightly inwardly from, the plane of manifold face 15. The depth of recess 26 within which the edges of the septum plate, other than its end 27, are received within the manifold has a depth of about 3/16 of an inch. The septum plate preferably is made of 304L stainless steel having a thickness of about 0.060 inches. The depth of recess 26 and the material of the septum plate, as compared to the material of the manifold body, are selected so that the septum plate maintains engagement within recess 26 throughout differential thermal expansion and contraction of the manifold and the septum plate. The septum plate is directly exposed to engine exhaust gases flowing through the manifold and is not effectively cooled by water flowing through jacket spaces 20. For those reasons, it is desireable to define the septum plate of a material which is more refractory than the material from which the manifold is made.

Persons knowledgeable about the design and operation of automotive internal combustion engines will appreciate that the firing sequence of the several cylinders of the engine are defined so that firing of the cylinders alternates between the front and rear groups of the engine cylinders. In the instance of a V-8 engine, the firing sequence alternates between the front and rear halves of the engine in each of the two banks of cylinders in the engine. That general rule applies to 4 cylinder, 6 cylinder, straight -8, and V-8 engines, although the specific sequence of cylinder firing in each kind of engine can vary within the front-rear-front-rear . . . general firing sequence.

The function of septum plate 25 within manifold 10 is to divide the inlet ports to the manifold into groups of at least two ports each, and to isolate the manifold internal spaces associated with each group from the spaces associated with each other group. In the instance of exhaust manifold 10 for use with a V-8 engine, as one of a set of two such manifolds, it is sufficient to subdivide the internal spaces in the manifolds in two so that there are two groups of two inlet ports so provided. A similar situation would prevail in an exhaust manifold designed for use in an in-line four cylinder internal combustion engine. In the instance of a manifold according to this invention designed for use with a in-line 6 cylinder engine, a single septum plate would be useful to establish two groups of three inlet ports each; in a manifold for an in-line 8 cylinder engine, a single septum, dividing the inlet ports into two groups of four parts each would be effective. That is, the manifold has N inlet parts, N being an even number at least equal to 4.

The benefit provided by septum plate 25 in manifold 10 is that its presence causes each inlet port in each group of ports to be isolated from the effects, within the manifold, occasioned by exhaust gas pressure levels associated with the cylinder which fires immediately before the cylinder associated with an inlet port of interest. For example, if, with reference to FIG. 2, the inlet ports are numbers 2, 4, 6 and 8, preceding left to right in association with engine cylinders 2, 4, 6, and 8 on the "even" side of a V-8 engine, the firing sequence in the engine could be 2, 6, 4, 8. In that event, cylinder 8 would be the cylinder on that side of the engine which fires immediately before cylinder 2. The inlet ports for cylinders 2 and 8 lie on opposite sides of septum 25 and are isolated from each other within the manifold by the septum. Therefore, when cylinder 2 exhausts, it sees a backpressure within the manifold which is minimally affected by the residual effects of exhausting of cylinder 8 and that backpressure is lower than the backpressure it would see if the septum were not present in the manifold. Because cylinder 2 exhaust to a manifold having reduced backpressure, engine cylinder 2 exhaust more efficiently and draws into it a fresh fuel-air charge more efficiently than if exhausting had to occur against an elevated backpressure in the exhaust manifold. More efficient exhaust and fuel-air charging effects in the combustion chambers of the engine means that the engine itself develops more power.

Figure 4:
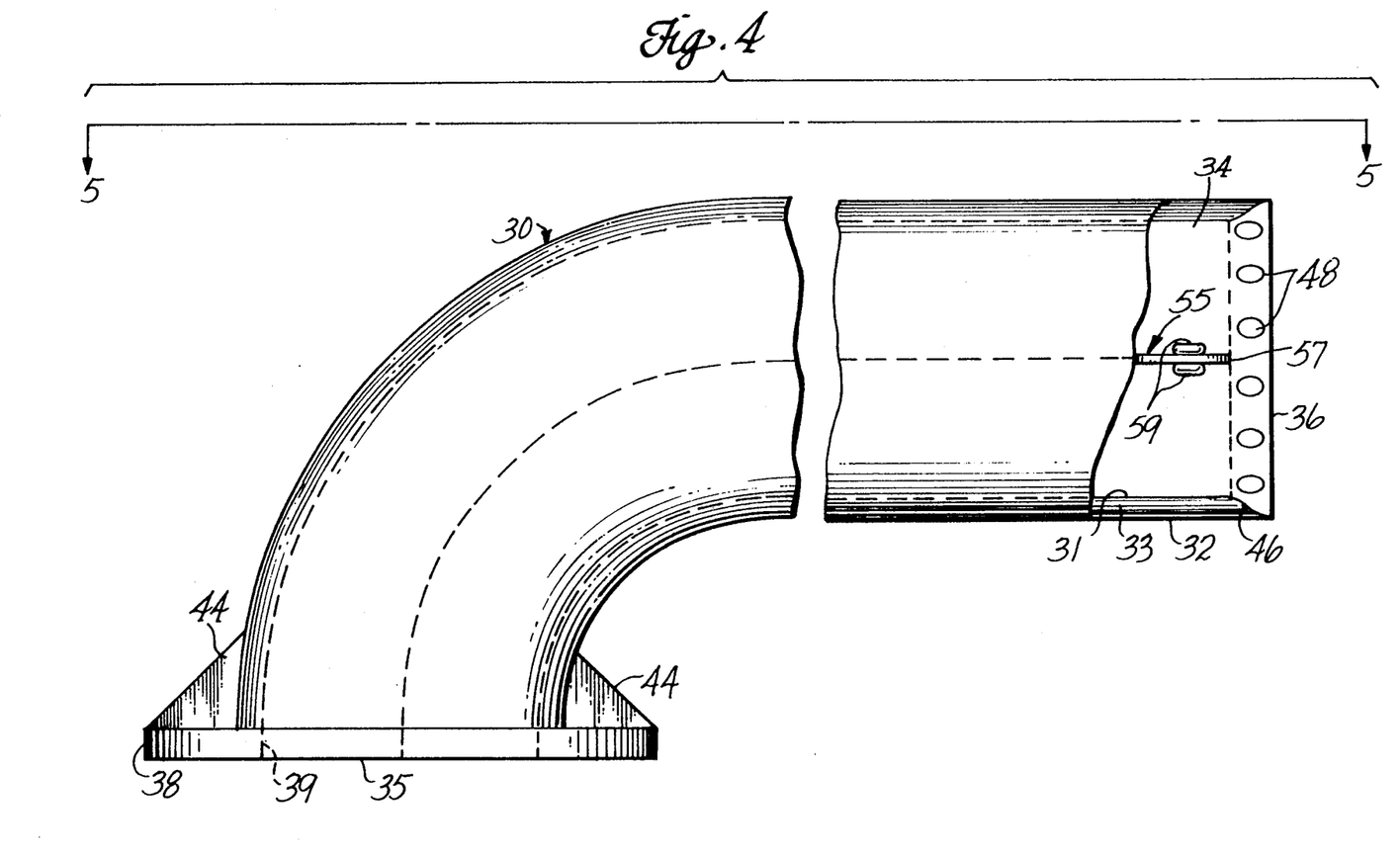
FIG. 4 is a fragmentary elevation view, partially in cross-section, of a header piper assembly useful with the exhaust manifold shown in FIG. 1.
Figure 5:
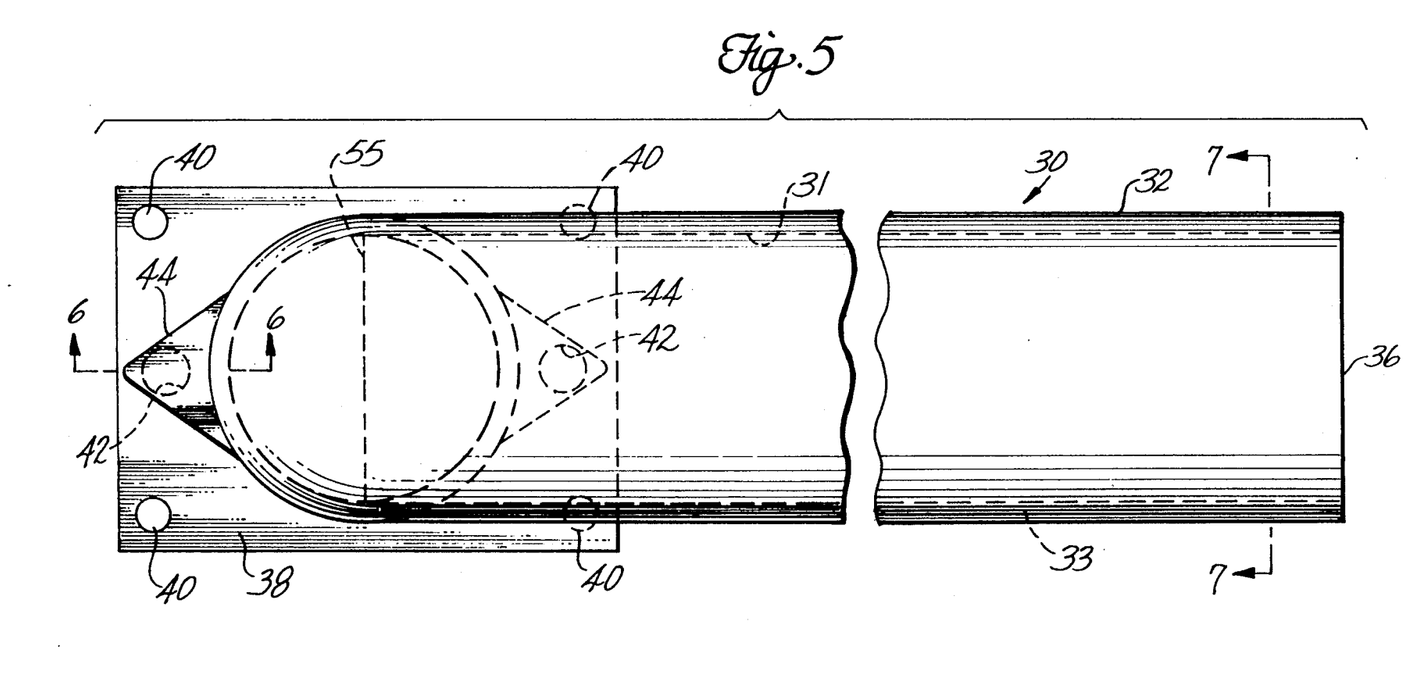
FIG. 5 is a view of the header pipe assembly taken substantially along line 5—5 in FIG. 4.
Figure 6:
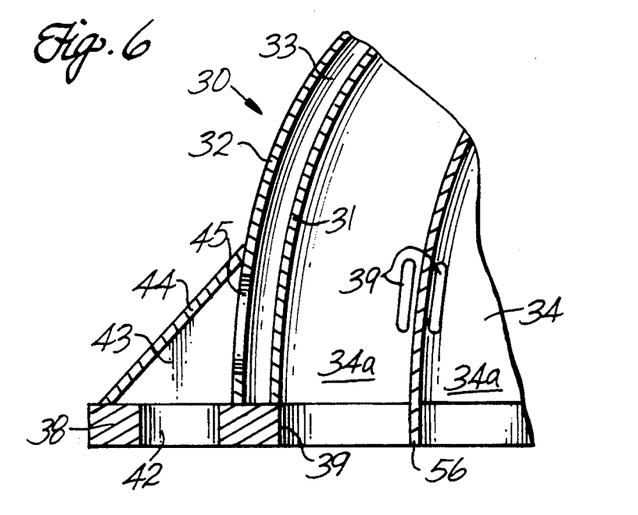
FIG. 6 is an enlarged fragmentary cross-section view taken along line 6—6 in FIG. 5.
Figure 7:
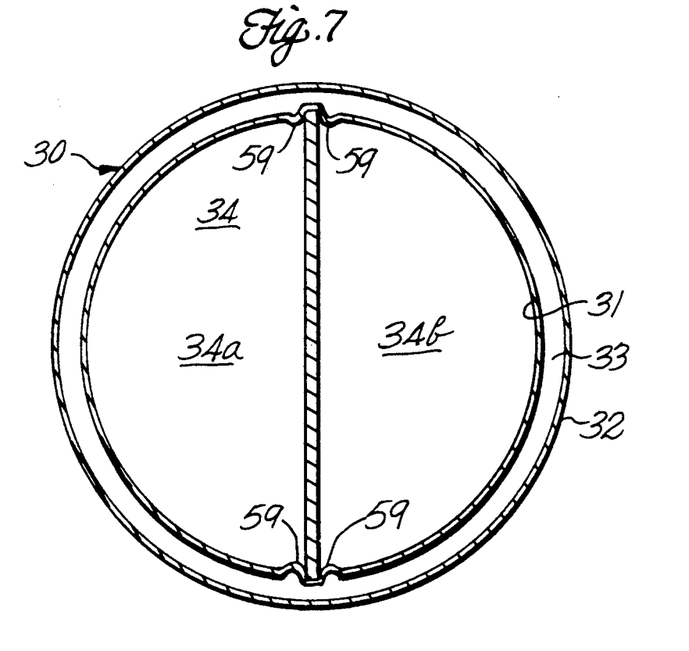
FIG. 7 is a cross-section view taken along line 7—7 in FIG. 5.

FIGS 4-6 show a header pipe assembly 30 which is arranged for use with manifold 10 to enhance the engine performance benefits achieved by the manifold. Header pipe 30 is water-jacketed and has inner and outer concentric ducts 31 and 32 defining between them an annular water jacket space 33 which surrounds a central exhaust gas passage 34 defined along the center of the header piper inside inner duct 31. The header pipe has an inlet end 35 and an outlet end 36. The inlet end is defined by a mounting flange 38 which has a central opening 39 through it of a size which preferably corresponds to the diameter of manifold outlet port 14. As shown best in FIG. 5, mounting flange 38 preferably has a rectangular configuration and defines through it, in each of its corners, a hole 40 through which a bolt can be passed for gasketed connection of the header pipe mounting flange to manifold 10 at face 15 in cooperation with the tapped holes 19 provided in the corners of the manifold outlet face. As shown in FIG. 6, the inlet ends of ducts 31 and 32 are both secured, as by welding, to flange 38.

Header pipe 30 is arranged to receive its cooling-jacket water from manifold 10. Accordingly, a pair of openings 42 are formed through mounting flange 38 at locations in the flange selected so that, when the flange is bolted or otherwise affixed to the manifold, openings 42 register with openings 22 through which water emerges from the jacket spaces 20 within the manifold. Openings 42 communicate from the flange into a chamber 43 defined within a respective housing 44 secured, as by welding, between the mounting flange and the adjacent outer surfaces of outer duct 32 in enclosing relation to each opening 42. An opening 45 is provided through the outer duct from each chamber 43 to the annular jacket chamber 33 defined in the header pipe between its inner and outer ducts 31 and 32, respectively.

As shown in FIG. 4, at its end opposite from mounting flange 38, inner duct 31 of the header pipe is flared, as at 46, outwardly into contact with the inner walls of the outer duct and is sealed, as by welding, to the inner duct at that location. A plurality of holes 48 are formed through the inner duct in its outwardly flaring portion or at suitable locations along the inner duct adjacent to but inwardly from the discharge end of the header pipe. Holes 48 provide for discharge of cooling water from jacket space 33 into the stream of exhaust gases flowing through the header pipe for discharge with those exhaust gases in a suitable manner.

Persons skilled in the art to which this invention pertains, manely, exhaust systems for inboard motor boats, will appreciate that the rear end of the header pipe can be connected directly to the transom of an inboard motor boat for discharge of engine exhaust gases and cooling water from the boat in that manner. Alternatively, discharge end of header pipe 30 can be located within the interior spaces of the boat and connected by a suitable duct, such as a flexible duct, to a fitting in the boat transom for discharge of engine exhaust gases and exhaust cooling water from the boat.

Header pipe assembly 30, as described to this point, is much like a conventional water-jacketed header pipe for an inboard marine engine. In actuality, header piper assembly 30 differs from a conventional header pipe assembly by the presence in it of a septum member 55 in the form of an elongate plate disposed diametrically across the interior of the inner duct. Septum member 55 extends from an inner end 56, lying substantially in the plane of the faying surface of mounting flange 38 (see FIG. 6), to a rear end 57 proximate the discharge end of the header pipe, preferably at about the location where the inner duct begins to flare into contact with the outer duct of the header pipe (see FIG. 4). The header pipe assembly preferably is curved at least once over its extent between its inlet and outlet ends. Septum plate 55 is defined to follow such curvature of the header pipe assembly and to be diametrically disposed within and across the inner duct of that assembly over such length.

The preferred mechanism for holding the header pipe septum plate in position within the header pipe is the use of dimples 59 which are provided in pairs ar selected locations (about three inch centers) along the inner duct and between which adjacent edges of the header pipe septum plate are disposed. The dimples are formed to extend inwardly of the inner duct and are spaced from each other within each pair a distance which affords a relatively snug yet movable fit of the edge of the plate between them. Such a mounting of the header pipe septum plate to the inner duct of the header pipe assembly is preferred over a positive connection, provided by welding, for example, to allow for differential thermal expansion of the different components of the header pipe assembly during use.

Dimples 59 are formed to protrude about 3/32 of an inch from the inner wall of the inner duct and have a spacing of about ¼ inch between them in each pair.

The preferred material for the inner and outer ducts of the header pipe assembly, is 304L stainless steel. The header pipe septum plate preferably s made of 304L stainless steel plate, having a thickness of about 0.060 inches.

It will be apparent from the preceding descriptions that when header pipe assembly 30 is connected in the intended manner to manifold 10, the inner end 56 of the header pipe septum plate is aligned with and essentially registers with end 27 of the manifold septum plate 25 at the plane of connection of the header pipe to the manifold. Accordingly, the gas flow duct within the header pipe assembly is subdivided into passages 34a and 34b which provided extensions of chambers 17a and 17b, respectively, in the manifold. As a result, the isolation between the forward and rear groups of inlet ports to manifold 10 is continued beyond the manifold along the length of the header pipe assembly, thereby greatly minimizing, if not altogether eliminating, the possibility for the exhaust gases entering the manifold through an inlet in one of the groups presenting backpressure to the next combustion chamber to fire in the engine to which the manifold is mounted in use.

It has been found, in experiments made with prototype manifold and header pipe sets according to this invention, that the presence of the septum plates in the manifold and header pipe results in substantial improvement in performance of the engines with which those exhaust structures are used. Exhaust gases flow from the engine through the manifold and the header pipe much more smoothly and with less turbulence and interaction than is encountered in comparable manifolds and header pipes having no septum plates therein. Thus, the practice of this invention brings to inboard engines for general purpose and family boats improvements in engine performance of a kind normally encountered only in racing boats where each engine cylinder has its own independent exhaust system. These improvements in engine performance are achieved while still respecting the considerable limitations imposed by factors of cost and size.

In view of the foregoing descriptions, persons skilled in the art to which this invention pertains will appreciate that the principles of this invention can be implemented in exhaust manifolds and header pipe assemblies for use with 4 cylinder, 6 cylinder and 8 cylinder engines in-line construction, as well as with engines of V-8 configuration.

The preceding descriptions have been set forth with reference to a presently preferred embodiment of the invention and are not intended as an exhaustive catalog of all forms in which the principles of this invention can be practiced. The following claims are to be read in that light and are to be given the broadest fair scope consistent with the advance made by this invention in the relevant art.

What is claimed:

1. An exhaust manifold for a multi-cylinder internal combustion engine comprising a manifold body configured internally thereof to define a plurality of inlet ports communicating within the body to an outlet port, the inlet ports opening through at least one engine face of the body via which the body can be mounted to an internal combustion engine of selected design for mating of the body inlet ports with respective exhaust opening defined by the engine in association with respective combustion chambers within the engine which fire in a selected sequence, the outlet port opening from the manifold body through a second face of the body via which the body can be connected to an exhaust pipe assembly for conducting engine exhaust gases from within the manifold to a desire discharge location spaced from the body, and septum means in the body having an end in the outlet port essentially at the second face for dividing the inlet ports into groups of at least two ports each and for isolating the body internal spaces associated with each group from the spaces associated with each other group, the septum means comprising a plate having an edge in the outlet port, the plate being loosely engaged substantially along all other portions of its perimeter within a recess defined within internal surfaces of the manifold.

2. An exhaust manifold according to claim 1 wherein the plate is defined of a material which is more refractory than the material of which the manifold body is defined.

3. An exhaust manifold according to claim 1 wherein the body includes in outer walls thereof spaces through which coolant fluid can be circulated, and a coolant inlet opening to and a coolant outlet opening from the spaces.

4. An exhaust manifold according to claim 3 which the coolant outlet is defined through the manifold body second face.

5. Apparatus according to claim 4 including an exhaust gas header pipe assembly connectible to the manifold body at the second face thereof, the assembly comprising inner and outer ducts having an annular passage between them and a central gas passage within the inner duct, and means for mounting the assembly at an inlet end thereof to the manifold body second face with the central passage registering with the outlet port and for communication of the coolant outlet opening to the annular passage.

6. Apparatus according to claim 5 including a septum member disposed substantially centrally across the inner duct and extending along the inner duct from an end at the inlet end at the inlet end of the assembly, the septum member end being disposed for substantially mating cooperation with the end of the manifold septum means upon connection of the assembly to the manifold.

7. An exhaust manifold for a multi-cylinder internal combustion engine comprising a manifold body configured internally thereof to define a plurality of inlet ports communicating within the body to an outlet port, the inlet ports opening through at least one engine face of the body via which the body can be mounted to an internal combustion engine of selected design for mating of the body inlet ports with respective exhaust openings defined by the engine in association with respective combustion chambers within the engine which fire in selected sequence, the outlet port opening from the manifold body through a second face of the body via which the body can be connected to an exhaust pipe assembly for conducting engine exhaust gases from within the manifold to a desired discharge location spaced from the body, septum means in the body having an end in the outlet port essentially at the second face for dividing the inlet ports into groups of at least two ports each and for isolating the body internal spaces associated with each group from the spaces associated with each other group, an exhaust pipe assembly connectible at an inlet end thereof to the manifold at the second face thereof, the pipe assembly including a duct defining a gas flow passage extending from the assembly inlet end and having an inlet opening matable with the manifold outlet port, and septum means in the duct and extending therealong from the passage inlet opening for dividing the passage into as many parallel parts as there are groups of manifold inlet ports, the pipe assembly septum means being disposed for substantial mating cooperation with the manifold septum means at the manifold outlet port upon connection of the pipe assembly to the manifold, the septum means being carried within the manifold and the pipe assembly in manners which accommodate differential thermal expansion and contraction of the respective septum means relative to the manifold body and to the duct.

8. Apparatus according to claim 7 wherein the manifold is a water jacketed manifold, and the manifold septum means is made of a material which is more refractory than the material from which the manifold body is made.

* * * * *